United States Patent [19]

Shimura

[11] Patent Number: 4,789,902
[45] Date of Patent: Dec. 6, 1988

[54] IMAGE SIGNAL PROCESSING METHOD
[75] Inventor: Kazuo Shimura, Kanagawa, Japan
[73] Assignee: Fuji Photo Film Co., Ltd., Kanagawa, Japan
[21] Appl. No.: 12,905
[22] Filed: Feb. 5, 1987
[30] Foreign Application Priority Data
 Feb. 5, 1986 [JP] Japan ................... 61-23476
[51] Int. Cl.$^4$ .............................. H04N 1/21
[52] U.S. Cl. ..................... 358/284; 358/280; 371/2
[58] Field of Search ............... 358/280, 284, 259, 138, 358/296, 301; 371/2
[56] References Cited
U.S. PATENT DOCUMENTS
 3,309,461  3/1967  Deutsch .................... 358/138
 4,449,149  5/1984  Ogawa ..................... 358/284

Primary Examiner—Howard W. Britton
Attorney, Agent, or Firm—Sughrue, Mion, Zinn, Macpeak, and Seas

[57] ABSTRACT

An image signal processing method for storing a series of image signals, which are arrayed in the array sequence of scanning lines on an image, on a recording medium or transmitting the image signals to a receiving device, and reproducing the image from the stored or transmitted image signals comprises the steps of dividing the series of the image signals into predetermined units in the course of storing or transmitting the series of the image signals, and storing or transmitting the image signals by changing the sequence of the respective units so that the units which were adjacent to each other do not adjoin each other. The image is reproduced by rearranging the units in the original sequence in the course of image reproduction.

3 Claims, 2 Drawing Sheets

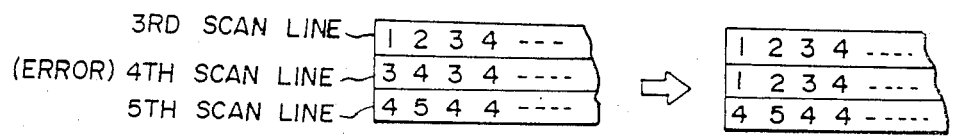
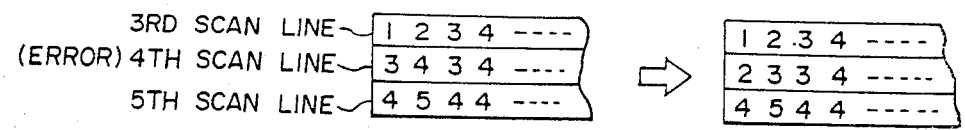
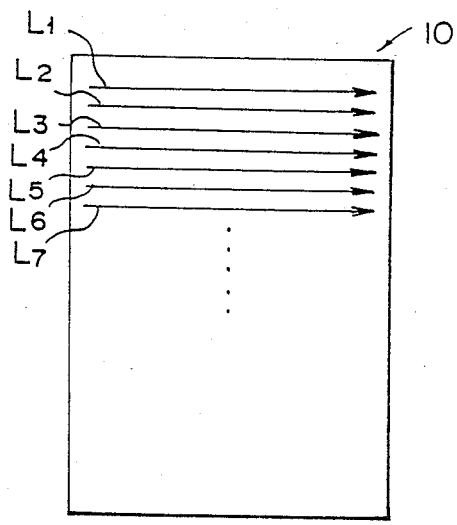
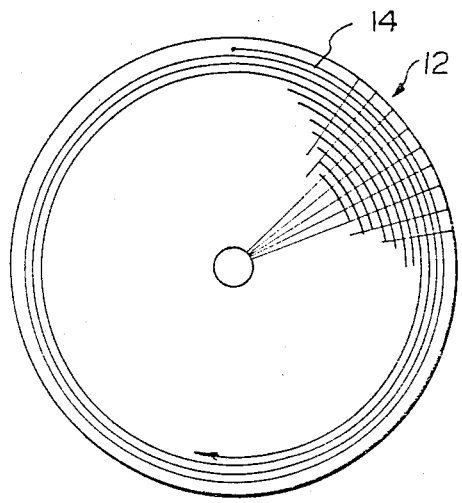
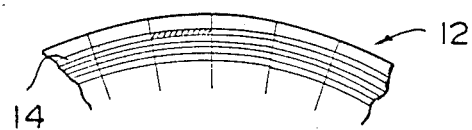

IMAGE SIGNAL PROCESSING METHOD

BACKGROUND OF THE INVENTION

1. Field of the invention

This invention relates to an image signal processing method for storing a series of image signals constituting an image on a recording medium such as an optical disk or transmitting the image signals to a remote section, and reproducing the image by use of the stored or transmitted image signals.

2. Description of the Prior Art

In recent years, an electronic filing system has been developed and put into practice. In the electronic filing system, an image recorded on a recording sheet is read out as digital image signals, appropriate image processing is conducted on the digital image signals, and the processed digital image signals are stored on a recording medium such as an optical disk and read from the recording medium when necessary for use in reproduction of a visible image.

In general, in the aforesaid electronic filing system, the image is read out by scanning of the recording sheet carrying the image recorded thereon, and the image signals obtained by the scanning are stored on the recording medium in the array sequence of scanning lines. Specifically, the image signals generated by sequential scanning of the image are stored on the recording medium in the sequence of generation of the image signals.

By way of example, an optical disk filing system wherein the image signals are recorded on an optical disk will hereinbelow be described in more detail. FIG. 4 is a schematic view showing the array sequence of scanning lines on a recording sheet, FIG. 5 is a schematic view showing the storing condition of image signals on an optical disk, and FIG. 6 is an enlarged view showing a part of the optical disk of FIG. 5. As shown in FIG. 4, a recording sheet 10 carrying an image recorded thereon is scanned in the sequence of a first scanning line L1, a second scanning line L2, a third scanning line L3, . . . from the upper portion of the recording sheet 10. As shown in FIG. 5, image signals generated (read out) by the scanning are stored in a spiral form on an optical disk 12 in the sequence of generation of the image signals. Therefore, the image signals are continuously stored on a track 14 in the array sequence of scanning lines, i.e. in the sequence of the first scanning line L1, the second scanning line L2, the third scanning line L3, . . . .

However, with the optical disk, a burst-like image signal error may arise when the image signals are stored on the optical disk or read out therefrom. For the purpose of this application, the term "burst-like error" is defined to mean such an error that a group of the image signals cannot be read out or, though they can be read out, the readout signals are not correct and not reliable. For example, as shown in FIG. 6, in the case of an optical disk 12, a single track 14 is ordinarily divided into a plurality of sectors (e.g. 64 sectors), and storing and reading of the image signals are conducted in an unit of the sector. Therefore, an error caused in the course of the storing, reading, or the like of the image signals often arises in a unit of the sector. In FIG. 6, the hatched portion denotes a single sector.

However, the image signals of, for example, three or four scanning lines are stored at a single sector in the array sequence of the scanning lines. Therefore, when a burst-like error in a unit of the sector arises, a group of the image signals on three or four adjacent scanning lines, for example, on the fourth scanning line L4, the fifth scanning line L5 and the sixth scanning line L6, become unreproducible at the time of image reproduction. Thus a serious image defect arises.

Though the problem that an image defect is caused by a burst error is typical in the case of the optical disk, it may arise also in the case of other recording media, for example, a magnetic disk, a magnetic tape, and a floppy disk.

The aforesaid problem arises not only in the course of storing the image signals on the recording medium and image reproduction but also in the course of transmitting the image signals with a facsimile device or the like.

For example, as one method of digital communication, packet communication wherein a series of information data is divided into units (called packets) and transmitted in this form is known. When the image signals are to be transmitted by packet communication and an error arises in one packet among a series of packets, a burst-like error is caused in the image signals corresponding to the error portion in the packets, and a group of the image signals becomes unreproducible.

SUMMARY OF THE INVENTION

The primary object of the present invention is to provide an image signal processing method wherein, even though a burst error arises, the error is rendered imperceptible in a reproduced image.

Another object of the present invention is to provide an image signal processing method wherein, even though a burst error arises, the error signal is corrected based on correct image signals present in the vicinity of the error signal, and the error is markedly rendered imperceptible.

The present invention provides an image signal processing method for storing a series of image signals, which are arrayed in the array sequence of scanning lines on an image, on a recording medium or transmitting the image signals to a receiving device, and reproducing the image from the stored or transmitted image signals, wherein the improvement comprises the steps of:

(i) dividing said series of the image signals into predetermined units in the course of storing or transmitting said series of the image signals, (ii) storing or transmitting the image signals by changing the sequence of the respective units so that the units which were adjacent to each other do not adjoin each other, and (iii) reproducing the image by rearranging the units in the original sequence in the course of image reproduction.

For example, in the method of the present invention, a series of image signals arrayed in the array sequence of scanning lines like the sequence of the image signals at a first scanning line portion, the image signals at a second scanning line portion, the image signals at a third scanning line portion, and so on are divided into units of a single scanning line. The series of the image signals are stored or transmitted by changing the sequence of the respective units like the sequence of, for example, the first scanning line, the fourth scanning line, the seventh scanning line, . . . , the second scanning line, the fifth scanning line, the eighth scanning line, . . . , the third scanning line, the sixth scanning line, the ninth scanning line, . . . . In the course of image reproduction, the image is reproduced by returning the sequence to the original sequence, i.e. the sequence of the first scanning line, the second scanning line, the third scanning line, . . . .

When the image signals are stored or transmitted in the changed sequence, even though burst errors such as errors in a sector unit of an optical disk arise, the errors become the errors of the image signals at, for example, the third, sixth and ninth scanning line portions. Thus since the errors are dispersed appropriately on a reproduced image, they become imperceptible.

With the image signal processing method in accordance with the present invention, when a series of the image signals arrayed in the array sequence of the scanning lines on an image are to be stored on a recording medium or transmitted to a receiving device, the series of the image signals are divided into units of an appropriate size, the sequence of the units is changed so that the units which were adjacent to each other do not adjoin each other, and the image signals thus rearranged are stored or transmitted. When the image is to be reproduced, the sequence of the units is returned to the original sequence, and the image signals thus returned to the original sequence are used for image reproduction. Therefore, even though burst errors arise in the course of storing, reading, or transmitting the image signals, only the image signals at a single unit portion per multiple unit portions become erroneous in the reproduced image. For example, when one unit is a single scanning line portion, only the image signals at a single scanning line per multiple scanning lines become erroneous. Thus it is possible to disperse the errors and render the errors imperceptible.

For example, when errors arise at a group of portions on the reproduced image, the image signals in the vicinity of the error signals also become erroneous. Therefore, it is not always possible to correct the error signal portions by inferring from the image signals present in the vicinity of the error signals. However, with the method of the present invention, since the errors are dispersed, the image signals present in the vicinity of the error signals are correct, and it is possible to correct the error signals by inference from the correct image signals present in the vicinity of the error signals. As a result, it becomes possible to render the burst errors markedly imperceptible.

BRIEF DESCRIPTION OF THE DRAWINGS

FIG. 4 is a schematic view showing the array sequence of scanning lines on a recording sheet, FIG. 5 is a schematic view showing the storing condition of image signals on an optical disk, and FIG. 6 is an enlarged view showing a part of the optical disk of FIG. 5.

DESCRIPTION OF THE PREFERRED EMBODIMENTS

The present invention will hereinbelow be described in further detail with reference to the accompanying drawings.

Figure 1A:
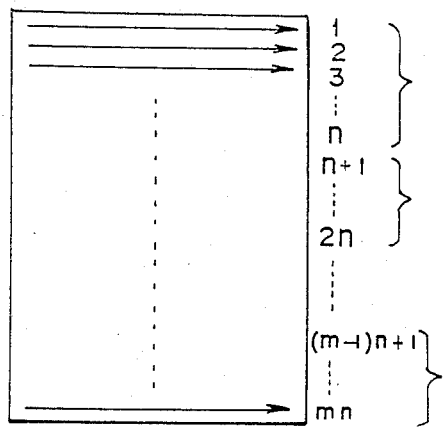
FIG. 1A is an explanatory view showing the condition prior to rearrangement of the image signal units in an embodiment of the image signal processing method in accordance with the present invention.
Figure 1B:
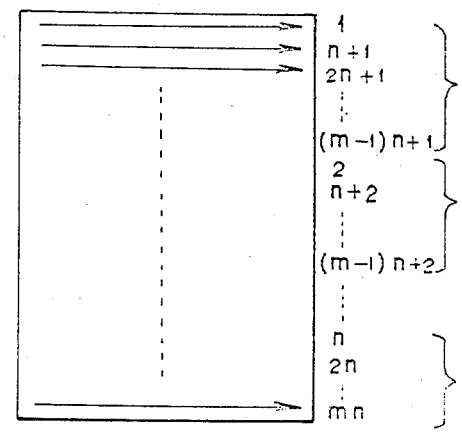
FIG. 1B is an explanatory view showing the condition after rearrangement of the image signal units in the embodiment of FIG. 1A.

FIGS. 1A and 1B show an embodiment wherein image signals representing a single image are rearranged as a whole. First, as shown in FIG. 1A, a series of image signals present in the array sequence of scanning lines like the sequence of image signals at a first scanning line portion, image signals at a second scanning line portion, image signals at a third scanning line portion, . . . are divided in a unit of a single scanning line, and an mn number of units in total are set. The sequence of the units is changed by alternately picking up the units at n number intervals. Specifically, as shown in FIG. 1A, the units from the first unit to the mn'th unit are present in the sequence as shown below.

$$1, 2, 3, \ldots, n,$$

$$n + 1, n + 2, n + 3, \ldots, 2n,$$

$$\vdots$$

$$(m - 1)n + 1, \ldots, mn.$$

As shown in FIG. 1B, the sequence of the units is changed to the sequence as shown below.

$$1, n + 1, 2n + 1, \ldots, (m - 1)n + 1$$

$$2, n + 2, 2n + 2, \ldots, (m - 1)n + 2$$

$$\vdots$$

$$n, 2n, 3n, \ldots, mn.$$

The image signals are stored in this sequence on a recording medium such as an optical disk. When the image which the image signals represent is to be reproduced, the units are rearranged in the original sequence, i.e. in the sequence of 1, 2, 3, . . . , mn−1, mn as shown in FIG. 1A, and used for reproducing the image.

In short, the rearrangement of the units from the sequence as shown in FIG. 1A to the sequence as shown in FIG. 1B is conducted so that the units which were adjacent to each other do not adjoin each other. As a result, even though burst errors arise in the course of storing or reading of the image signals, the errors become errors of the image signals at, for example, the n'th unit, the n+2'th unit and the 2n+2'th unit, i.e. errors of the image signals at the n'th scanning line portion, the n+2'th scanning line portion and the 2n+2'th scanning line portion. On a visible image reproduced by rearranging the units in the original sequence, the errors appear in the form dispersed at intervals of n number of the scanning lines.

In the aforesaid embodiment, all of the image signals representing a single image are rearranged. Therefore, in the case of an image composed of, for example, 1,600 scanning lines, m and n may be respectively adjusted to e.g. 40, 40. Thus it is possible to adjust n to a very large value. As a result, it becomes possible to disperse errors at large intervals on the reproduced image, i.e. to increase the intervals among error scanning lines. On the other hand, with this method, a buffer having a capacity to store all of the image signals representing a single image is necessary for changing the sequence of the units of the image signals in the course of storing or reading of the image signals.

FIGS. 2A to 2D show another embodiment of the image signal processing method in accordance with the present invention. In this embodiment, a series of image signals are divided into a plurality of blocks, and the sequence of the blocks is maintained unchanged. Instead, in each block, the image signals are divided into predetermined units in the same manner as shown in FIG. 1A. The sequence of the units is changed so that the units which were adjacent to each other do not adjoin each other, and the image signals are stored in this form. When the image is to be reproduced, the sequence of the units is returned to the original sequence.

Figure 2A:
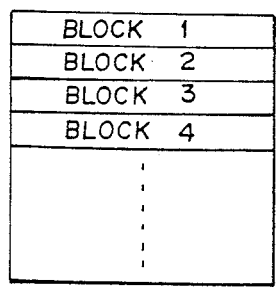
FIG. 2A is an explanatory view showing the condition of division of a series of image signals into a plurality of blocks in another embodiment of the image signal processing method in accordance with the present invention.
Figure 2B:
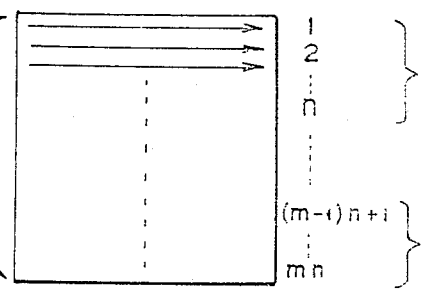
FIG. 2B is an explanatory view showing the condition prior to rearrangement of image signal units in a single block in the embodiment of FIG. 2A, FIGS. 2C and 2D are explanatory views showing the conditions after rearrangement of image signal units in a single block in the embodiment of FIG. 2A, FIGS. 3A and 3B are explanatory views showing the methods of correcting the image signals at image signal portions where errors arose.

Specifically, as shown in FIG. 2A, the overall image signals are divided into a plurality of blocks, for example, 10 blocks. In the course of storing the image signals, the sequence of the blocks is maintained unchanged, and the image signals are rearranged in each block. For example, as shown in FIG. 2B which is an enlarged view of the block 3 of FIG. 2A, the image signals in the block 3 are divided into mn number of units in a unit of a single scanning line. The mn number of the units ($m=4$, $n=4$ in this case) are rearranged in the same manner as shown in FIG. 1B into the sequence as shown in FIG. 2C, and the image signals are stored on the recording medium in this sequence.

In this embodiment, since rearrangement of the image signal units is conducted in each block, this embodiment is advantageous in that the buffer for the rearrangement does not need to have a large capacity, and may have the capacity to store the image signals of only a single block. However, n cannot be adjusted to large value, and therefore it is impossible to increase the intervals of dispersion of error scanning lines on the reproduced image, i.e. to increase the intervals of the error scanning lines.

Figure 2C:
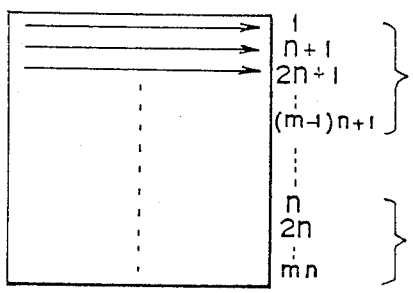
Figure 2D:
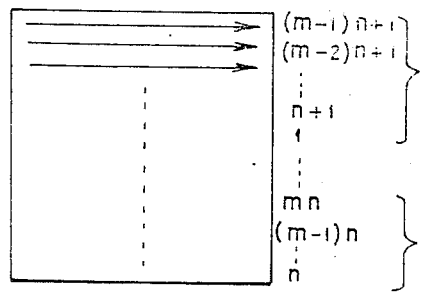

In the case where rearrangement of the image signal units in each block is conducted as shown in FIG. 2C, the units (scanning lines) which were adjacent to each other adjoin each other at the boundary portions among the blocks after the rearrangement. For example, the last unit (scanning line) of the block 2 and the first unit (scanning line) of the block 3 adjoin each other after the rearrangement. In order to prevent this problem, units should preferably be rearranged as shown in FIG. 2D into the following sequence.

$$(m-1)n + 1, (m-2)n + 1, \ldots, n+1, 1$$
$$\vdots$$
$$mn, (m-1)n, \ldots, n.$$

In the method of the present invention, the image signal units are rearranged so that the units which were adjacent to each other do not adjoin each other. This requirement does not necessarily define that, in the case where the number of the adjusted units is markedly large, for example, in the case where a single scanning line is adjusted to be a single unit as mentioned above and 1,600 units are set, the rearrangement be conducted so that all of the units which were adjacent to each other do not adjoin each other. In such a case, even though some of the units which were adjacent to each other come to adjoin each other, for example, as shown in FIG. 2C, the rearrangement may be regarded as being substantially conducted so that the units which were adjacent to each other do not adjoin each other.

When the image signals are stored and used for image reproduction as mentioned above, even though burst errors arise, since it is possible to disperse the positions of the errors on the reproduced image and to render the errors imperceptible, the image signals at the error units (scanning lines) need not necessarily be corrected. However, the error signals may be corrected by an appropriate method, thereby rendering the burst errors markedly imperceptible.

The error signals may be corrected by various methods, for example, by inferring what the correct signals at the error positions are from the image signals present in the vicinity of the error image signal portions.

For example, in the case where burst errors arise when the image signals are rearranged as shown in FIG. 1B and the image signals at the fourth, 44th and 84th scanning line portions become error signals, the image signals at the fourth scanning line portion may be replaced by, for example, the image signals at the third scanning line portion, or the image signals at the fifth scanning line portion, or the average values (with fractions omitted) of the image signals at the third and fifth scanning line portions. The image signals at the 44th and 84th scanning line portions may be corrected in the same manner.

FIG. 3A shows the case where the image signals at the fourth scanning line portion at which errors arose are replaced by the image signals at the third scanning line portion, and FIG. 3B shows the case where the image signals at the fourth scanning line portion at which errors arose are replaced by the average values of the image signals at the third and fifth scanning line portions. In FIGS. 3A and 3B, the left diagrams indicate the conditions prior to the replacement, and the right diagrams indicate the conditions after the replacement.

In the case where an error arises only at a part of the image signals at a single scanning line, only the error portion should preferably be replaced as mentioned above.

In the aforesaid embodiments, the predetermined unit for delimiting a series of the image signals is adjusted to be the image signal unit at a single scanning line portion. However, the size of the predetermined unit may be adjusted as desired on the basis of a difference in the size of the burst error caused by a difference in the recording medium.

Though the case where the image signals are stored on the recording medium such as an optical disk is mentioned above, also in the case of the transmission of the image signals by packet communication as mentioned above, it is possible to render the burst errors imperceptible by rearranging the image signals as mentioned above.

The method of the present invention is applicable also to the case where the image signals are compressed by redundancy suppression encoding processing such as prediction encoding or encoding by orthogonal transformation and then stored or transmitted. In this case, after the image signal units are rearranged as mentioned above, the image signals may be compressed and stored on the recording medium. In the course of image reproduction, the image signals may be read from the recording medium, extended and returned to the original image signals. Then, the image signal units may be rearranged in the original sequence, subjected to signal correction when necessary, and used for image reproduction on a CRT or the like.

It should be understood that the present invention is not limited to the aforesaid embodiments and may be modified in various manners within the scope of the invention.

I claim:

1. An image signal processing method for storing a series of image signals on a recording medium and reproducing the image from the stored image signals, wherein the improvement comprises the steps of:
   (i) dividing said series of image signals into a plurality of predetermined units;
   (ii) storing the image signals by dividing said series of image signals into a plurality of blocks, and changing the sequence of respective units within each of said blocks so that predetermined units which were adjacent to each other do not adjoin each other; and
   (iii) reproducing the image by rearranging the predetermined units in the original sequence in the course of image reproduction.

2. An image signal processing method for storing a series of image signals on a recording medium and reproducing the image from the stored image signals, wherein the improvement comprises the steps of:
   (i) dividing said series of image signals into a plurality of predetermined units;
   (ii) storing the image signals by dividing said series of image signals into a plurality of blocks, and changing the sequence of respective units within each of said blocks so that predetermined units which were adjacent to each other do not adjoin each other;
   (iii) reproducing the image by rearranging the predetermined units in the original sequence in the course of image reproduction; and
   (iv) in the case where an image signal error arises in the course of storing said image signals, or in the course of reading said stored image signals, the image signal at the image signal portion where said error arose is inferred from the image signals in the vicinity of said image signal portion where said error arose and used for image reproduction in the course of image reproduction.

3. An image signal processing method for storing a series of image signals on a recording medium, and reproducing the image from the stored image signals, wherein the improvement comprises the steps of:
   (i) dividing said series of image signals into a plurality of predetermined units, wherein a unit size of said predetermined units is determined on a basis of a difference in a size of burst errors expected during storing and reproducing operations;
   (ii) storing the image signals by dividing said series of image signals into a plurality of blocks, and changing the sequence of respective units in each of said blocks so that predetermined units which were adjacent to each other do not adjoin each other;
   (iii) reproducing the image by rearranging the predetermined units in the original sequence in the course of image reproduction; and
   (iv) in the case where an image signal error arises in the course of storing said image signals, or in the course of reading said stored image signals, the image signal at the image signal portion where said error arose is inferred from the image signals in the vicinity of said image signal portion where said error arose and used for image reproduction in the course of image reproduction.

* * * * *